United States Patent [19]

Rudner et al.

[11] 4,178,161
[45] Dec. 11, 1979

[54] MANUFACTURE OF RIGIDIZED CONVOLUTED FOAM FROM FLEXIBLE POLYURETHANE FOAM AND RESULTANT PRODUCT

[75] Inventors: Bernard Rudner, Ridgewood; David Reich, Paramus, both of N.J.; Edward Galica, Hialeah, Fla.

[73] Assignee: Tenneco Chemicals, Inc., Saddle Brook, N.J.

[21] Appl. No.: 928,225

[22] Filed: Jul. 26, 1978

Related U.S. Application Data

[63] Continuation of Ser. No. 740,952, Nov. 11, 1976, abandoned.

[51] Int. Cl.$^2$ ............... B01D 39/16; B29C 17/00
[52] U.S. Cl. ............... 55/524; 55/DIG. 13; 264/129; 264/284; 264/293; 264/DIG. 48; 427/244
[58] Field of Search ............... 427/209, 211, 244; 428/311, 315; 156/207, 208, 210; 264/286, 129, 293, DIG. 48, 284; 210/496, 506, 510; 55/521, 524, DIG. 13

[56] References Cited

U.S. PATENT DOCUMENTS

| 3,269,887 | 8/1966 | Windecker | 427/244 X |
| 3,558,393 | 1/1971 | Bolliand et al. | 156/210 X |

FOREIGN PATENT DOCUMENTS

| 795294 | 9/1968 | Canada | 428/311 |
| 977929 | 12/1964 | United Kingdom | 427/244 |

Primary Examiner—Evan K. Lawrence
Attorney, Agent, or Firm—John Boustead; James P. Scullin

[57] ABSTRACT

A rigidized convoluted foam suitable as a self-standing filter is made by passing a sheet of air-permeable flexible polyurethane foam through a convoluting machine to obtain two unnested sheets of convoluted foam, each sheet being convoluted on only one side. The two sheets are nested and impregnated from the flat surface of each sheet almost to the closest valley surface with a thermosetting melamine, urea, or benzoguanamine resin in an amount to not appreciably impair the permeability of the foam and to increase the rigidity of the foam sufficiently so that each unnested sheet will be self-standing. After the resin has reacted, the nested sheets are separated.

24 Claims, 4 Drawing Figures

MANUFACTURE OF RIGIDIZED CONVOLUTED FOAM FROM FLEXIBLE POLYURETHANE FOAM AND RESULTANT PRODUCT

This is a continuation of Ser. No. 740,952 filed Nov. 11, 1976, abandoned.

BACKGROUND OF THE INVENTION

It is known in the art to manufacture convoluted foam, for example, polyester, polyether, polyvinyl chloride or urethane foam. Machines for the manufacture of convoluted foams of various profiles, both symmetric and unsymmetric, are commercially available, for example, from Fecken-Kirfel KG located in Aachen, West Germany. In such machines, a sheet of flexible polyurethane foam having a thickness, for example, of from 1½ to 8 inches can be passed between a pair of rollers having the desired surface configuration or pattern. These rollers squeeze the sheet of foam, and immediately after passing between the rollers and while still in a state of patterned compression the sheet is cut in two by means of a knife to provide two sheets, one side of each of which is convoluted and the other side of each of which has not been changed by passing through the machine.

Flexible foam sheet is convoluted as described because the convoluted foam provides more filtration surface for the same perimeter and because convoluted foam weighs only about one-half as much as unconvoluted foam of the same superficial volume. Foam is impregnated in order to increase its efficiency as a filter and also to increase its rigidity. Thus, air filters are conventionally manufactured with a metal frame to provide support for the filter. The present invention makes possible the manufacture of foam of sufficient rigidity that air filters embodying it are sufficiently rigid that no metal frame is required.

SUMMARY OF THE INVENTION

In accordance with the method of this invention, it has been discovered that flexible convoluted air-permeable foam can be made rigid provided that the foam is impregnated with a mixture of a thermosetting melamine, urea or benzoguanamine resin and a cross-linker while the foam is in the form of a nested pair. By the term "nested", it is meant that the convolution peaks of one of the pair are positioned in the valleys of the other one of the pair, so that the combination when being impregnated has essentially the same thickness as the sheet introduced into the convoluting machine. The nested pair of sheets is back impregnated on each side to a depth less than the valley of each sheet, following which the resin and cross-linker are reacted. The thermosetting resin and cross-linker are used in an amount to not appreciably impair the permeability of the foam and to increase the rigidity of the foam sufficiently so that each unnested sheet will be self-standing. After the resin has reacted, the nested sheets are separated.

The product of the invention is the resultant, partially-impregnated, convoluted, air-permeable sheet which can be used as a self-standing filter. The thermosetting resin and cross-linker are used in an amount to not appreciably impair the permeability of the foam and to increase the rigidity of the foam sufficiently so that each unnested sheet will be self-standing. After the resin has reacted, the nested sheets are separated.

The product of the invention is the resultant, partially-impregnated, convoluted, air-permeable sheet which can be used as a self-standing filter.

DESCRIPTION OF THE PREFERRED EMBODIMENTS

Figure 1:
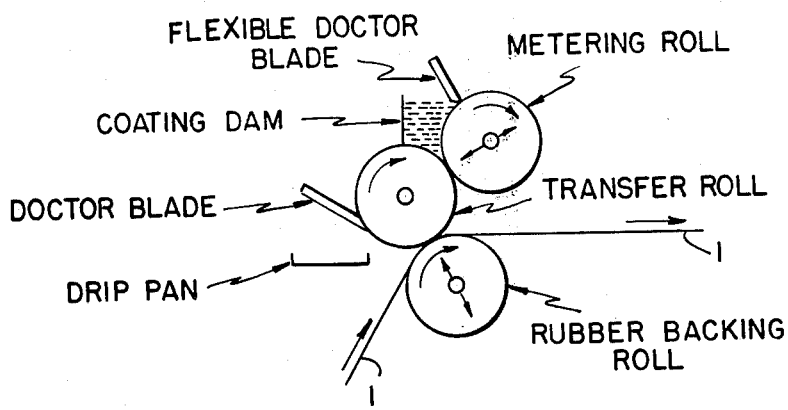
FIG. 1 represents in diagrammatic form an arrangement of apparatus known in the art as a nip-fed, three-roll reverse roll coater. The process of this invention can be carried out using such apparatus.

Among the thermosetting melamine resins which can be used are compounds of the generic formula

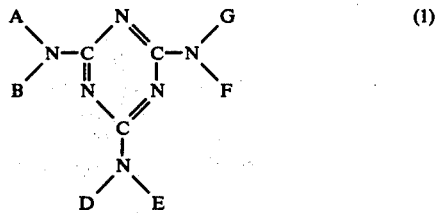

wherein A,B,D,E,F or G can be hydrogen. However, at least one of A,B,D,E,F and G is

wherein R and R' are hydrogen or an alkyl radical having from one to four carbon atoms and can be the same or different. Specific compounds falling within the scope of the preceding generic formula are tris-(hydroxymethyl) melamine, tris-(hydroxymethyl)-tris-(methoxymethyl) melamine, hexa-(methoxymethyl) melamine, hexa-(hydroxymethyl) melamine, monobutoxymethyl melamine, mono-(alpha-hydroxy ethyl) melamine, tris-(alpha-methoxyethyl) melamine and tetra-(alpha-hydroxy-n-propyl) melamine.

Among the thermosetting urea resins which can be used are compounds of the generic formula

wherein one of L and M can be hydrogen. The other of L and M is

wherein R and R' are hydrogen or an alkyl radical containing from one to four carbon atoms and can be the same or different. Specific compounds falling within the scope of the immediately preceding formula are monomethylolurea, bis-methylol urea, bis-alpha-hydroxyethyl urea, and bis-alpha-hydroxy-n-butyl urea.

Among the thermosetting benzoguanamine resins which can be used are compounds of the generic formula

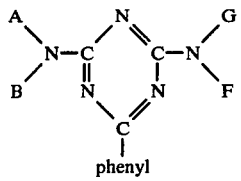

wherein A,B,G or F can be hydrogen. Here again, however, at least one of A,B,G and F is

wherein R and R' are hydrogen or an alkyl radical from one to four carbon atoms and can be the same or different. The thermosetting benzoguanamine resins can be prepared by the reaction of benzoguanamine and a source of formaldehyde, such as formalin or paraformaldehyde, and, if desired, can be etherified with a lower monohydric alcohol, such as methanol, ethanol or n-butanol.

In practicing the present invention, any of the known cross-linkers for melamine, urea and guanamine resins can be used. Among such cross-linkers are polycarboxylic acids which contain at least three carboxyl groups, for example, tricarballylic acid, mellitic acid, ethylene diamine tetraacetic acid, nitrilotriacetic acid, diethylene triamine pentaacetic acid, hydroxyethyl ethylene diamine triacetic acid, vinyl-acrylic copolymers sold, for example, by Union Carbide Corporation under the trademark Ucar, and ethylene-acrylic acid copolymers sold, for example, by The Dow Chemical Company as EEA Resin 435, EEA Resin 449, EEA Resin 455 and EEA Resin 459 containing 3.5, 8, 8 and 8, percent combined acrylic acid by weight, respectively.

Also among the cross-linkers which can be used in practicing this invention are polyanhydrides which contain at least two carboxylic acid anhydride groups per molecule. Such polyanhydrides can be monomeric, for example, benzene 1,2,4,5-tetracarboxylic acid dianhydride or benzophenone tetracarboxylic acid dianhydride or 1,4-dithiabutylenebis-(succinic anhydride), or polymeric, for example, the commercially available styrene-maleic anhydride copolymers or the ethylene maleic anhydride copolymers.

Furthermore, the cross-linker can be a polyepoxide which contains at least two epoxy groups per molecule, such as the di-glycidyl ether of bisphenol-A (for example, Epon 828 which is a proprietary condensation product of epichlorohydrin and bisphenol-A having an epoxide equivalent of 185–205 measured as grams of resin containing one gram-equivalent of epoxide) and vinylcyclohexene diepoxide. Poly(epoxymethoxy) novolaks and the Bakelite cycloalphatic epoxy resins sold by Union Carbide under the product designations ERRA-4090, ERL-4206, ERL-4221, ERL-4234 and ERL-4289 having epoxy equivalents (gm. per gm. mol oxirane oxygen) of 390–430, 70–74, 131–143, 133–154, and 205–216, respectively, are also useful cross-linkers. Essentially, any polyfunctional organic reactant known to cross-link and thermoset melamine-formaldehyde resins can be used as the cross-linker, such as amine-terminated polyamide resins, phenol, dicyandiamide and blocked polyisocyanates.

For maximum stiffness at any given impregnation level, the flexible polyurethane foam is impregnated with approximately stoichimetric quantities of thermosetting melamine, urea or guanamine resin, and cross-linker. When stoichimetric quantities are used, the impregnation is carried out using, for each

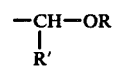

present in the melamine, urea and benzoguanamine resins used (R and R'; having been previously defined), a total of carboxyl groups, epoxide groups and one-half carboxylic acid anhydride group amounting to one. It is not required, in practicing this invention, that stoichimetric quantities be used, but preferably neither the amount of resin nor the amount of cross-linker used should be in excess of 200 percent of the stoichiometric amount. Also, in order to increase the rigidity of the flexible foam, the amount of dry weight pick-up after reacting the resin and cross-linker will generally be within the range from 10 to 300 weight percent, based on the weight of the polyurethane foam. Where the foam after reacting the resin and cross-linker is to be used as a filter, the dry weight pick-up should not be sufficient to impair the permeability of the foam appreciably.

The polyols suitable for use in preparing the polyurethane foam can be polyester polyols or polyether polyols, such as those made by the addition of an excess of propylene-1,2-oxide to hexane triol, trimethylolpropane, glycerol and triethanol-amine. Also, the polyols suitable for use in preparing the polyurethane foam can be a mixture of polyester polyols and polyether polyols. The polyester polyol can be prepared, for example, by reacting a dicarboxylic acid, such as adipic acid, with a mixture of a diol, such as diethylene glycol, and a triol, such as glycerol.

The polyether polyol can also be selected from any of the wide variety of polyhydric polyether compounds available and conventionally used by the art for the preparation of polyether-type polyurethanes. The most common polyether polyol compounds, the polyoxyalkylene polyether polyols, are generally prepared by the reaction of an alkylene oxide, such as propylene-1,2-oxide, with a polyhydric initiator or starter. The polyhydric initiator or starter can be, for example, glycerol, trimethylolethane or trimethylolpropane.

The alkylene oxides used in preparing the polyethers preferably are these which contain from two to four carbon atoms, for example, ethylene oxide, 1,2-propylene oxide, 1,2-butylene oxide, trimethylene oxide and tetramethylene oxide. Also useful are the poly (aralkylene ether) polyols which are derived from the corresponding aralkylene oxides such as, for example, styrene oxide, alone or mixed with an alkylene oxide. Generally, propylene oxide, i.e., the 1,2-propylene oxide, and mixtures of 1,2-propylene oxide with ethylene oxide, are preferred for the preparing of the polyether polyol reactant.

The polyethers suitable for use in preparing the polyurethane foam impregnated preferably have a molecular weight of from about 500 to about 4500 and optimally of from about 2800 to about 3800 and an average hydroxy functionality of at least 2.7 to about 3.3.

The polyester polyol reactants useful in preparing the polyurethane foam include any conventionally used in the preparation of flexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the polyurethane foams in the present invention is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, isophthalic acid, tetrachlorophthalic acid, cycloaliphatic acids such as cyclohexane-1,4-diacetic acid, but especially the aliphatic acids such as tricarballylic, oxydipropionic, succinic, glutaric, adipic, azelaic, suberic and sebacic acids, hydrogenated fatty acid dimer, or combinations of such acids. The polyester polyols can also be prepared from the corresponding lactones, such as gamma-butyrolactone or epsilon-caprolactone, for example.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between about 2.2 and 2.8. A functionality of greater than two is desirable to provide cross-linking in the reaction between the polyester polyol and the polyisocyanate to form a flexible, but strong foam.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the preparation of the polyurethane foam are also conventional. They contain at least two isocyanate groups per molecule. Preferably, the isocyanate mixture selected has an isocyanate functionality of from 2.0 to 3.0. The useful isocyanates are the aromatic polyisocyanates, alone or admixed with aliphatic, cycloaliphatic or heterocyclic polyisocyanates.

The aromatic diisocyanates are generally the least expensive and most reactive polyisocyanates available. The aromatic diisocyanates, especially the toluene diisocyanate isomers, are used commercially in the preparation of foam by the one-shot, continuous slab-stock process. However, for certain purposes, other polyisocyanates, especially the aliphatic, aralkyl and cycloalkyl polyisocyanates have valuable properties and can be used, if desired, in admixture with, e.g., toluene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylene diisocyanate, p-xylene diisocyanate, cyclohexyl-1,4-diisocyanate, dicyclohexylmethane-4,4'-diisocyanate, m-phenylene diisocyanate, p-phenylene diisocyanate, 3-(alpha-isocyanatoethyl)-phenyl isocyanate, 2,6-diethylbenzene-1,4-diisocyanate, diphenyldimethylmethane-4,4'-diisocyanate, ethylidene diisocyanate, propylene-1,2-diisocyanate, cyclohexylene-1,2-diisocyanate, 2,4-toluene diisocyanate, 2,6-toluene diisocyanate, 3,3'-dimethyl-4,4'-biphenylene diisocyanate, 3,3'-dimethoxyl-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthylene diisocyanate, isophorone diisocyanate, m-xylylene diisocyanate, triazine tri-isocyanate, triketotrihydrotris (isocyanatophenyl) triazine and tris (isocyanatophenyl) methane.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the polyurethane foam is water. Thus, advantages of using water are low cost and the stability which the use of water adds to the foam-making. The water-isocyanate reaction gives not only gas for blowing, but urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about −40° C. and +70° C., including methylene chloride; the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures and the like.

If desired, the polyurethane foam can contain conventional impingement fluids, fillers, flame-retardants, colorants or other materials, added during the foam making, or before, during, or after the impregnation with the thermosetting resin. Among the useful impingment fluids are the silicone oils such as dimethyl silicones, chlorinated paraffins, tris-(dinonylphenyl) phosphate, di-tridecyl phthalate, polyethylene glycol dibenzoates, polyphenyls, hydrogenated polyphenyls, poly (tetramethylene glycol) azealates, and aryl sulfonamides and their formaldehyde condensates.

The following Examples illustrates the invention or provide comparisons with respect thereto and are to be considered not limitative of the invention.

EXAMPLE I

Figure 4:
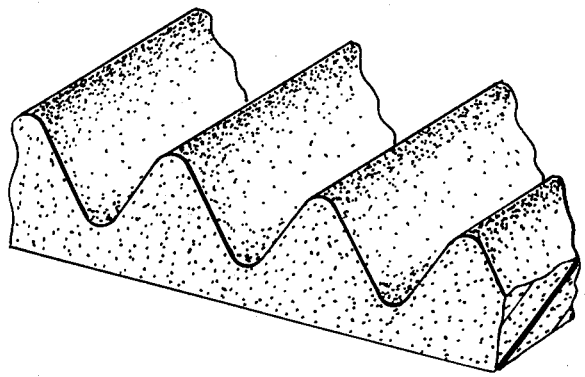
FIG. 4 is a partial perspective of a fragment of polyurethane foam convoluted in a parallel rib pattern.

In this example, the flexible polyurethane foam made rigid in accordance with this invention was manufactured by the procedure described in U.S. Pat. No. 3,748,288 to Winkler, Bredbenner and Adlum. A sample of the foam having a thickness of 1½ inch was passed through a convoluting machine to provide convolutions in a parallel rib pattern (FIG. 4). The two pieces of foam thereby produced were then nested.

Pieces of the nested pair having a length of four inches and a width of six inches were completely impregnated to a 72 percent dry weight pick-up by immersing them in the following formulation in parts by weight: water-base latex cross-linker containing 50 percent by weight of acrylate copolymer containing 2-3 percent by weight of combined acrylic acid, 200; tri(methoxy methyl) trimethylol melamine, 50; aqueous dispersion containing 30 percent by weight of carbon black, 3; anti-foam such as 2-ethylhexanol; clay filler, 10; and 50 percent by weight aqueous solution of p-toluenesulfonic acid, 2.

Samples of the nested foams were separated immediately after impregnation, and other samples were allowed to stand without being heated until dry to the touch and were then separated into two uniformly impregnated convoluted foam webs without difficulty. All the samples could be oven-cured at 350° F. to react the melamine compound and copolymer to provide rigid polyurethane foam. However, when the freshly-impregnated nested pair of foams was oven-cured before separation, they could not be separated without tearing the foam.

Samples of convoluted foam which were oven-cured after separation of the impregnated nested pair were self-supporting when stood on their edges. On the other hand, separated samples of convoluted foam which either were not impregnated or were impregnated but not over-cured sagged too much to be self-supporting.

EXAMPLE II

Fully impregnated convoluted flexible polyurethane foams give rise to processing problems which can be fully overcome by a two-pass operation on a nip feed, three-roll reverse roll coater such as that illustrated in FIG. 1. In FIG. 1, the numeral 1 represents a nested pair of parallel rib pattern (FIG. 4) convoluted flexible polyurethane foam being impregnated, the various parts of the apparatus being described in the drawing.

The impregnating composition used in this Example was composed of the following ingredients in parts by weight: water-based latex of Example I, 200; tri(methoxymethyl) trimethylol melamine, 481; proprietary pyrogenic silica pigment, 50; and 50 percent by weight aqueous solution of p-toluenesulfonic acid, 2.

In the operation, a strip of the nested pair of convoluted flexible polyurethane foam having a width of about 26 inches and a thickness of 1½ inch was impregnated on one side almost to the closest valley surface to a 30 percent dry weight pick-up. Thus, in the impregnation, the impregnant did not reach the valley floor of the strip being impregnated. The nested pair was then passed through a curing oven having three sections maintained in the downstream direction at 310° F., 360° F. and 350° F., respectively, whereby the melamine compound was reacted with the latex to produce a stiff, nested foam pair. The sheet of nested foam was again passed through the apparatus of FIG. 1, but this time, however, the reverse side of the nested foam was similarly impregnated, with the same impregnating composition and impregnating almost to the closest valley surface to about a 30 percent dry weight pick-up. Following this, the nested foam was again passed through the curing oven to react the melamine compound with the latex.

The foam thereby produced could be easily separated. Each separated piece had about the same extent of impregnation, the separated pieces were about equally stiff, and the separated pieces had about 95 percent of the air permeability of original, unimpregnated foam.

EXAMPLES III TO VIII

In these examples, nested pairs of convoluted flexible polyether-based polyurethane foams having a parallel rib pattern (FIG. 4) were impregnated. The various pairs had a thickness of 1½ inch, a length of four inches and a width of six inches.

In each of these Examples III to VIII, the impregnant compositions were in parts by weight:

Example III. Water-based latex of Example I, 200; tri(methoxymethyl) trimethylol melamine, 481; proprietary pyrogenic silica pigment, 50; and 50 percent by weight aqueous solution of p-toluenesulfonic acid, 2.

Example IV. In parts by weight, a commercial solution of a urea-formaldehyde thermosetting resin in water containing 30 percent by weight of the resin, 100; aqueous emulsion of a butene-maleic anhydride copolymer cross-linker containing 25 percent by weight of the copolymer, 100; and commercial ammonium metaphosphoroimidate, 5.

Example V. In parts by weight, a solution containing 80 percent by weight of tris-(methoxymethyl) melamine, 40; emulsion containing 20 percent by weight of ethylene-acrylic acid copolymer, 100; and magnesium chloride, 4.

Example VI. In parts by weight, a commercial solution containing 50 percent by weight of a glyoxal-urea-formaldehyde thermosetting resin, 60; water-base latex of Example I, 40; and 50 percent by weight aqueous solution of p-toluene-sulfonic acid, 2.

Example VII. In parts by weight, a commercial solution containing 20 percent by weight of thermosetting benzoguanamine-formaldehyde-methanol resin, 150; water-base latex of Example I, 40; and 50 percent by weight aqueous solution of p-toluenesulfonic acid, 2.

Example VIII. The composition of Example II (733 parts by weight) plus commercial ammonium phosphorimidate (5 parts by weight) plus an emulsion containing 50 percent by weight of tris-(2,3-dibromopropyl) phosphate (10 parts by weight).

Figure 2:
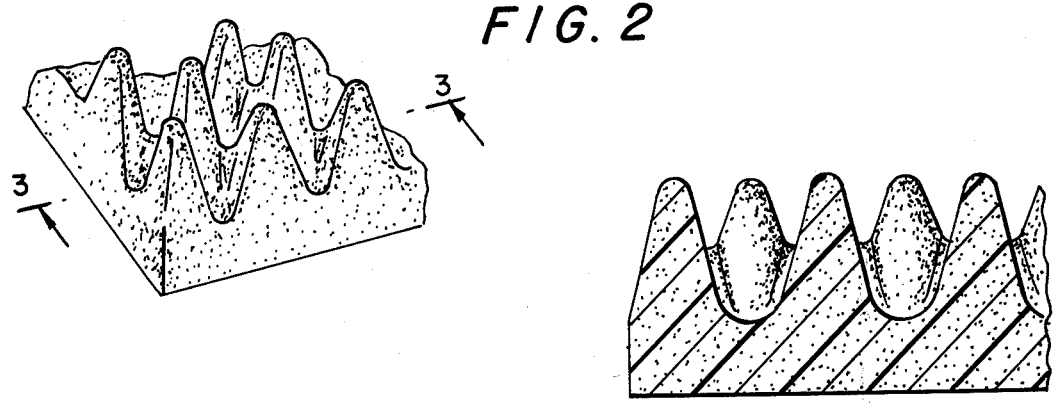
FIG. 2 is a partial perspective of a fragment of polyurethane foam convoluted in a pattern known in the art variously as point, mound or cone.
Figure 3:
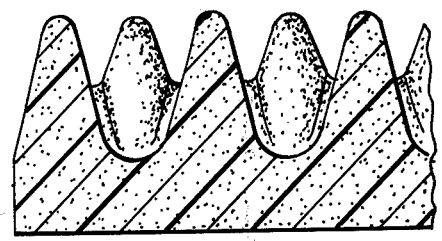
FIG. 3 is a cross-section taken along the line 3—3 of FIG. 2.

The compositions of Examples III through VIII were employed in the laboratory to impregnate nested pairs of cone convoluted (FIG. 2) flexible ether base polyurethane foam. The nested samples impregnated were four inches long by six inches wide by 1½ inches thick.

In carrying out the impregnation, a laboratory pan was filled to a mark which permitted back-impregnation up to just below the valley surface of the lower foam. The foam pair was then turned over, and the opposing flat was impregnated with the same solution to the same depth. The unsqueezed pair of foam pieces was then oven-dried at 320° F. for five minutes. In each case, each flat foam surface was impregnated, repeatedly when necessary, to a 50-60 percent dry weight pick-up. Where more than one impregnation was necessary, the foam was cured by oven-drying at 320° F. for five minutes after each impregnation.

All of the single sheets of convoluted foam having a thickness of one inch were stiff and self-standing after being separated, with the foams impregnated with the compositions of Examples V, III and VIII being the stiffest. All the impregnated samples had at least 90 percent of the air permeability of the untreated samples. When tested by the ignition procedure of MVSS302, all the impregnated samples showed less extensive burning than the unimpregnated foam. The foam impregnated with the composition of Example IV showed less extensive burning than any of the others, with the exception of the foam impregnated with the composition of Example VIII, which did not sustain a flame when the source of ignition was removed.

EXAMPLES IX TO XII

In these Examples, a green filter foam which was manufactured in the plant was used. The foam was manufactured using the following formulation in parts by weight:

| | |
|---|---|
| Polyester derived from diethylene glycol, trimethylolpropane, and adipic acid: mol. wt. 2000, hydroxyl no. 52 | 85.0 |
| Propoxylated glycerol: mol. wt. 3500, hydroxyl no. 48 | 7.0 |
| Tolylene diisocyanate (80/20) | 49.4 |
| Ethoxypropoxylated polysiloxane | 3.5 |
| Poly(dimethylsiloxane) (Viscosity 50cs) | 0.6 |
| Water | 3.5 |
| Stannous octoate solution, 50% in tricresyl phosphate | 0.2 |
| N-ethylmorpholine | 0.1 |
| Triethylenediamine solution, 33% in dipropylene glycol | 0.25 |
| Tribromoneopentyl alcohol solution, 60% in 3000 mol. wt. propoxylated glycerol | 20.0 |

The foam was cut into 10 feet by three feet by two inches pieces, which were convoluted in a parallel rib pattern (FIG. 4) and then treated as follows:

Example IX. A nested pair was fully (completely) impregnated to about a 48 percent dry weight pick-up with the dispersion-emulsion of Example I and using essentially the procedure of Example I. A fixed plastic bar was used to separate the top convoluted foam before the bottom one entered the curing oven, the oven being that of Example II. The top layer of foam was cured in the oven after the bottom one was cured. Various samples were taken of each cured layer. All the samples had a 48±4 percent dried weight pick-up.

Example X. Example IX was repeated, except that the dispersion-emulsion also contained 10 parts by weight of an 80 percent by weight dispersion of tris-(2,3-dibromopropyl)-phosphate.

Example XI. Example X was repeated, except that the dispersion-emulsion also contained 10 parts by weight of an emulsion of about 30 percent by weight of dimethyl silicone oil (500 centistoke viscosity) in water.

Example XII. The dispersion-emulsion of Example XI was used to apply a coating of about 57 percent dry weight pick-up to only a single back, flat surface of the pair of convoluted foams, using a gravure print roll and controlling the speed and application such that no dispersion-emulsion touched the valley floor of the foam the surface of which was wet. After the foam was cured unseparated, the foam was returned, inverted and the other side was likewise treated.

A comparison of the processes and products of Examples IX to XII showed:

(a) The procedure of Example XII is simpler, quicker, and requires less labor time, but requires more dispersion-emulsion than the procedure of Example XI to provide an equally satisfactory product;

(b) The foam of Example X is more nearly flame-retardant according to MVSS302 than are the foams of either Examples XI or XII, which in turn are more flame-retardant than the foam of Example IX.

(c) The foam product of Example XI catches more dust at the same pressure build up than the foam products of Examples IX and X, but slightly less dust than the foam product of Example XII.

What is claimed is:

1. A process for the manufacture of a convoluted polyurethane foam self-standing filter which comprises the steps of: (a) passing a sheet of air-permeable flexible polyurethane foam that is capable of being impregnated with a thermosetting resin, said sheet having a thickness of from about 1¼ inches to about 8 inches, through a convoluting machine whereby two unnested sheets of convoluted foam are provided, each of said sheets being convoluted on only one side; (b) nesting said two unnested sheets of convoluted foam; (c) impregnating one of said nested sheets, by means of immersion, reverse-roll coating, or gravure roll coating, from the flat surface of the sheet almost to the closest valley surface of the sheet with a thermosetting melamine, urea, or benzoguanamine resin, and a cross-linker, the combined dry weight of said thermosetting resin and said cross-linker after reaction being from about 10 percent to about 300 percent of the dry weight of said polyurethane foam and being an amount to not appreciably impair said foam permeability and to increase the rigidity of said polyurethane foam sufficiently that said unnested sheet will be self-standing; (d) reacting said thermosetting resin and said cross-linker without separating said nested sheets; (e) repeating steps (c) and (d) on the other of said nested sheets; and, (f) separating said nested sheets, thereby providing convoluted polyurethane foam which is rigid enough to be self-standing.

2. The process of claim 1 wherein the melamine resin conforms to the generic formula

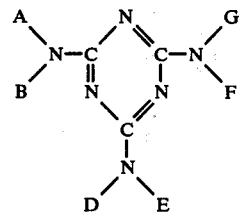

wherein A,B,D,E,F and G are hydrogen, with the proviso that at least one of A,B,D,E,F and G is

wherein R and R' are hydrogen or an alkyl radical containing from one to four carbon atoms.

3. The process of claim 2 wherein the melamine resin is tri(methoxymethyl) trimethylol melamine.

4. The process of claim 2 wherein the melamine resin is tris-(methoxymethyl)-melamine.

5. The process of claim 1 wherein the cross-linker is an ethylene-acrylic acid copolymer.

6. The process of claim 1 wherein the cross-linker is a butene-maleic anhydride copolymer.

7. The process of claim 1 wherein the urea resin conforms to the generic formula

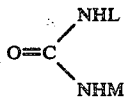

wherein one of L and M are hydrogen, with the proviso that at least one of L and M is

wherein R and R' are hydrogen or an alkyl radical containing from one to four carbon atoms.

8. The process of claim 7 wherein the urea resin is a urea-formaldehyde resin.

9. The process of claim 1 wherein the urea resin is a glyoxal-urea-formaldehyde resin.

10. The process of claim 1 wherein the benzoguanamine resin conforms to the generic formula

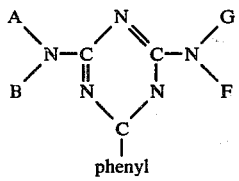

wherein A,B,G and F are hydrogen, with the proviso that at least one of A,B,G and F is

wherein R and R' are hydrogen or an alkyl radical from one to four carbon atoms.

11. The process of claim 10 wherein the benzoguanamine resin is a benzoguanamine-formaldehyde-methanol resin.

12. The product of the process of claim 1.

13. A process for the manufacture of a convoluted polyurethane foam self-standing filter which comprises the steps of: (a) passing a sheet of air-permeable flexible polyurethane foam that is capable of being impregnated with a thermosetting resin, said sheet having a thickness of from about 1¼ inches to about 8 inches, through a convoluting machine whereby two unnested sheets of convoluted foam are provided, each of said sheets being convoluted on only one side, (b) nesting said two unnested sheets of convoluted foam; (c) impregnating each of said nested sheets, by means of immersion, reverse-roll coating, or gravure roll coating, from the flat surface of the sheet almost to the closest valley surface of the sheet with a thermosetting melamine, urea, or benzoguanamine resin, and a cross-linker, the combined dry weight of said thermosetting resin and said cross-linker after reaction being from about 10 percent to about 300 percent of the dry weight of said polyurethane foam and being an amount to not appreciably impair said foam permeability and to increase the rigidity of said polyurethane foam sufficiently that each unnested sheet will be self-standing; (d) reacting said thermosetting resin and said cross-linker; and (e) separating said nested sheets, thereby providing convoluted polyurethane foam which is rigid enough to be self-standing.

14. The process of claim 13 wherein the melamine resin conforms to th generic formula

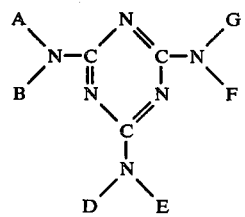

wherein A,B,D,E,F and G are hydrogen, with the proviso that at least one of A,B,D,E,F and G is

wherein R and R' are hydrogen or an alkyl radical containing from one to four carbon atoms.

15. The process of claim 14 wherein the melamine resin is tri(methoxymethyl) trimethylol melamine.

16. The process of claim 14 wherein the melamine resin is tris-(methoxymethyl)-melamine.

17. The process of claim 13 wherein the cross-linker is an ethylene-acrylic acid copolymer.

18. The process of claim 13 wherein the cross-linker is a butene-maleic anhydride copolymer.

19. The process of claim 13 wherein the urea resin conforms to the generic formula

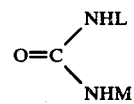

wherein one of L and M are hydrogen, with the proviso that at least one of L and M is

wherein R and R' are hydrogen or an alkyl radical containing from one to four carbon atoms.

20. The process of claim 19 wherein the urea resin is a urea-formaldehyde resin.

21. The process of claim 13 wherein the urea resin is a glyoxal-urea-formaldehyde resin.

22. The process of claim 13 wherein the benzoguanamine resin conforms to the generic formula

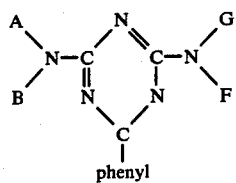
wherein A, B, G and F are hydrogen, with the proviso that at least one of A, B, G and F is
wherein R and R' are hydrogen or an alkyl radical from one to four carbon atoms.
23. The process of claim 22 wherein the benzoguanamine resin is a benzoguanamine-formaldehyde-methanol resin.
24. The product of the process of claim 13.

UNITED STATES PATENT AND TRADEMARK OFFICE
CERTIFICATE OF CORRECTION

PATENT NO. : 4,178,161
DATED : Dec. 11, 1979
INVENTOR(S) : Bernard Rudner et al.

It is certified that error appears in the above-identified patent and that said Letters Patent are hereby corrected as shown below:

Column 1, line 17, change "$1\frac{1}{2}$" to -- $1\frac{1}{4}$ --

Column 1, lines 61-68 should be deleted since paragraph duplicates the text appearing at column 1, lines 55-60 and column 2, lines 1-3

Column 7, line 44, change "over-cured" to -- oven-cured --

Column 7, line 49, change "feed" to -- fed --

Claim 14, line 2, change "th" to -- the --

Signed and Sealed this

Twenty-fifth Day of March 1980

[SEAL]

Attest:

SIDNEY A. DIAMOND

Attesting Officer

Commissioner of Patents and Trademarks